United States Patent
Burkes et al.

(10) Patent No.: US 7,272,076 B2
(45) Date of Patent: *Sep. 18, 2007

(54) METHOD FOR DETERMINING A WARRANTY START DATE

(75) Inventors: Theresa A. Burkes, Meridian, ID (US);
George B. Clifton, Boise, ID (US);
Steven R. Folkner, Boise, ID (US);
Angela K. Hanson, Eagle, ID (US);
Linda S. Rodda, Star, ID (US);
Patrick D. Walker, Eagle, ID (US);
Kenneth J. O'Hara, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1178 days.

This patent is subject to a terminal disclaimer.

(21) Appl. No.: 09/888,941

(22) Filed: Jun. 25, 2001

(65) Prior Publication Data

US 2002/0198729 A1    Dec. 26, 2002

(51) Int. Cl.
*G06F 17/60* (2006.01)
*H04Q 7/20* (2006.01)

(52) U.S. Cl. .................. 368/29; 705/1; 705/7; 455/466; 455/414; 455/418; 455/419; 455/420; 455/550

(58) Field of Classification Search ...................... None
See application file for complete search history.

(56) References Cited

U.S. PATENT DOCUMENTS 6,519,470 B1 *   2/2003   Rydbeck ...................... 455/466
6,798,719 B1 *   9/2004   Muta et al. ................... 368/29

FOREIGN PATENT DOCUMENTS

GB       2366400 A      3/2002
JP       2000250969     9/2000

OTHER PUBLICATIONS

Warranty Period Notification Device, Hiroshi Umezaki; Document No. JP 2000-250969, Pub Date Sep. 14, 2000 (translation attached herein).*

* cited by examiner

*Primary Examiner*—John G. Weiss
*Assistant Examiner*—Matthew L. Brooks

(57) ABSTRACT

A method for determining a warranty start date for a product has steps of determining a warranty start event and generating a warranty start date after occurrence of the warranty start event. The timestamp may be generated through a query to a time server on a network connected to the product. Preferred examples of warranty start events comprise first use by the user, and production of a specified cumulative quantity of product output. The warranty start event as well as the generated warranty start date are preferably stored on a memory internal to the product.

11 Claims, 2 Drawing Sheets

METHOD FOR DETERMINING A WARRANTY START DATE

FIELD OF THE INVENTION

The present invention is related to methods for determining a warranty start date. More particularly, the present invention is related to a method for accurately determining the date of a warranty start event such as a product first use date for products that may comprise computer peripherals.

BACKGROUND OF THE INVENTION

Most durable products are provided with a warranty. Under the terms of the warranty, the product manufacturer may guarantee the satisfactory performance of the product for a period of time referred to as the "warranty period". The manufacturer may agree under terms of the warranty to repair, replace, or to otherwise service the product upon the occurrence of a defect, malfunction, or other problem during the warranty period. The length of the warranty period varies between products and manufacturers. Depending on these factors, typical warranty periods may range from 90 days to 3 years.

Providing an effective warranty period, and in particular determining the start of a warranty period, has proven difficult. Although the date of manufacture of a product may be known with precision by the manufacturer, this has not proven to be a satisfactory warranty start date. In many instances products are manufactured and then enter a distribution chain where they may be shipped and warehoused several times before they arrive at the ultimate seller. Once at the ultimate seller, the product may be stored for another period of time before sale. This can result in a significant time lapse between manufacture and ultimate sale, with the result that consumers are unfairly penalized if the date of manufacture is used as a warranty start date.

As a result, most present day warranties begin on the date of purchase. While this has solved a few problems related to date of manufacture warranty start dates, it has introduced new sets of problems. For example, it is difficult for the manufacturer to know the date of actual sale to an end user. Users may be required to mail product documentation, sales receipts, and the like to the manufacturer to mark the start of a warranty. Because of the effort required, purchasers often do not comply, which can lead to loss of warranty rights and resultant low customer satisfaction. To avoid this low customer satisfaction, manufacturers may waive requirements when an end user has a product failure and instead rely on the end user's affirmation alone that the product was purchased on a date that places the failure within the warranty period. Such reliance, however, can disadvantageously lead to lengthened warranty periods as end users may fabricate purchase dates to obtain warranty coverage.

Additional problems with purchase based warranty start dates relate to users that may purchase a product but not use it for a prolonged period. Business purchasers, for instance, may purchase products such as computer peripherals that are shipped and stored after purchase before actual use. This can disadvantageously delay the actual product use for substantial time periods after purchase. For these users, the warranty period is effectively shortened because of the delay between purchase and actual use of the product.

These and other unresolved problems remain in the art.

SUMMARY OF THE INVENTION

The present invention is directed to a method and a computer program product for determining a warranty start date for a product. An embodiment of a method of the present invention generally comprises the steps of: defining a warranty start event, generating a timestamp with the product after the occurrence of the warranty start event, and using the timestamp as the warranty start date. The timestamp is stored for reference in a memory that is preferably internal to the product, but may also be remote from the memory and accessed over a network. Further, the timestamp may preferably be reported by the product over the network to a warranty database for manufacturer record keeping.

Preferably, the product is a computer peripheral such as a printer, facsimile machine, copier, or the like that produces documents. In this preferred embodiment, the warranty start event may comprise production of a specified number of documents, and the timestamp may be obtained through query of a time server over the network. In additional embodiments of the invention, the warranty start event may comprise other events, with examples comprising first power-up, installation of a driver, connection to a network, and the like. Preferred warranty start events may also allow for preliminary product testing or demonstration without triggering the warranty start period. Still additional preferred steps of various embodiments of the invention also comprise encrypting the timestamp prior to saving in the memory, and outputting the encrypted timestamp from the product in the form of a diagnostic indicator for reporting to the manufacturer.

The present invention thereby provides a novel and elegant solution to many of the otherwise heretofore unresolved problems in the art. For example, a warranty start date is provided based on a defined event such as date of first use that solves problems of the prior art related to purchase date or manufacture date warranty starts. Additionally, the warranty start date is accurately generated by the product itself without required user action. This solves warranty start date problems in the art related to user inaction or user fabrication.

Those knowledgeable in the art will appreciate that the present invention lends itself well to practice in the form of a computer program product. Accordingly, additional embodiments of the present invention comprise computer program products for causing a product to determine a warranty start date, the program product comprising computer executable instructions stored in a computer readable medium that when read by the product causes the product to execute the general steps of method embodiments of the invention.

The above brief description sets forth broadly some of the more important features and advantages of the present disclosure so that the detailed description that follows may be better understood, and so that the present contributions to the art may be better appreciated. There are, of course, additional features of the disclosure that will be described hereinafter that form the subject matter of the claims appended hereto. In this respect, before explaining the embodiment of the disclosure in detail, it is to be understood that the disclosure is not limited in its application to the details of the construction set forth in the following description or illustrated in the drawings. The present invention may provide additional embodiments, as will be appreciated by those knowledgeable in the art. Also, it is to be understood that the phraseology and terminology employed herein are for description and not limitation.

DETAILED DESCRIPTION

Figure 1:
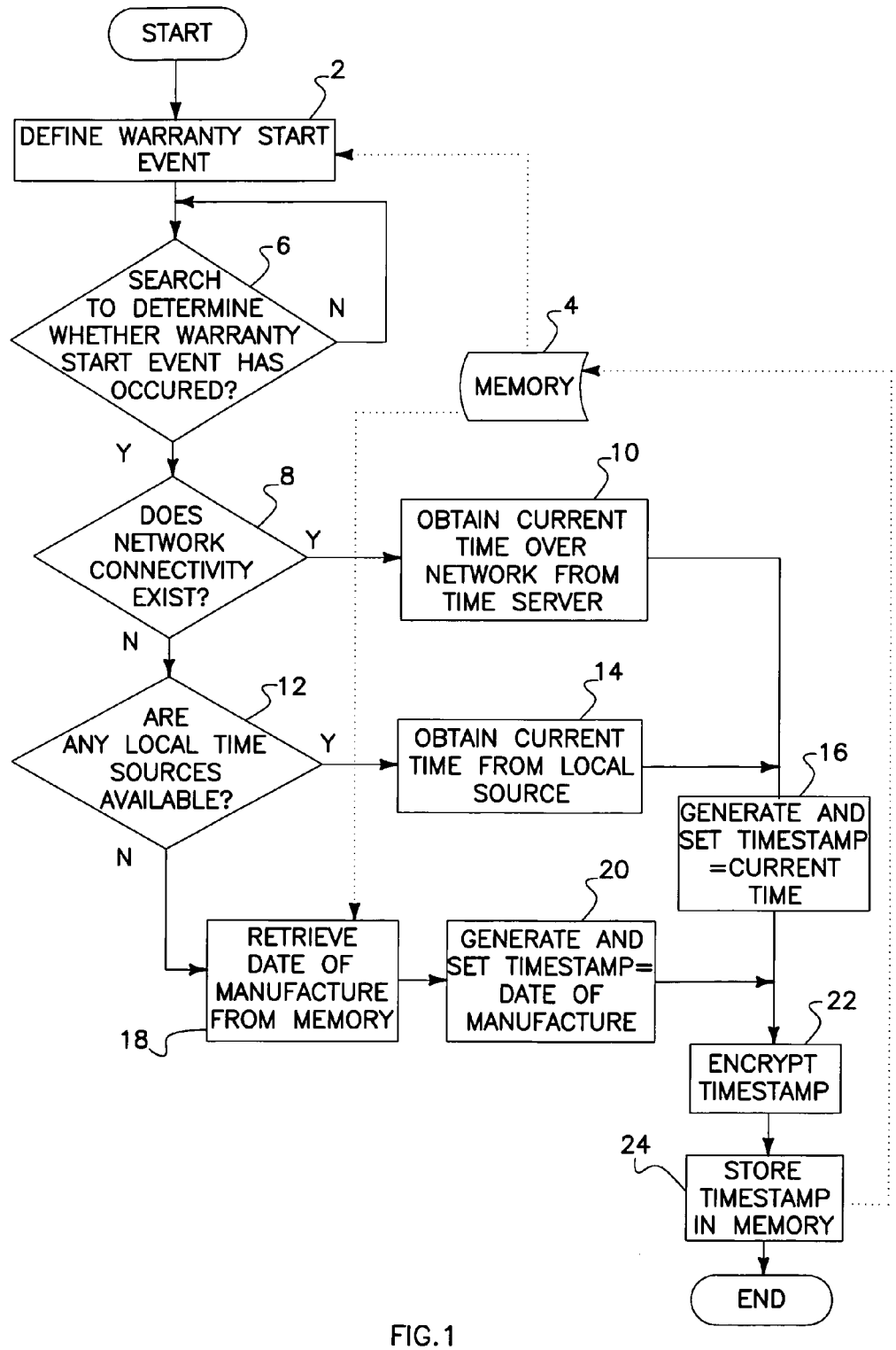
FIG. 1 is a flow chart illustrating steps of one embodiment of the method and computer program product of the invention.

Turning now to the drawings, FIG. 1 is a flow chart that will be helpful in describing a method embodiment as well as a computer program product embodiment of the invention. In this respect it will be appreciated that the present invention lends itself well to practice in the form of a method as well as a computer program product. Description made herein of an invention method embodiment may therefore likewise apply to a computer program product embodiment, with the understanding that the computer program embodiment will cause a computer to perform the method steps as described.

As an initial step of a method embodiment, a warranty start event is defined and stored in a memory (block 2). In a corresponding computer program product embodiment, the program product may cause a computer to retrieve a stored warranty start event from the memory. In either case, a "warranty start event" as used herein is intended to refer to an event that upon occurrence will mark the beginning of a warranty period. A preferred warranty start event comprises the date of first use of a product.

In preferred embodiments of the method and program product of the invention, including the embodiment illustrated in the flow chart of FIG. 1, the invention is for practice with a computer peripheral that produces document output, such as a printer, scanner, facsimile machine, multi-function machine, or the like. Under this preferred practice, then, the date of first use may correspond to the date of first document production.

Additional preferred invention steps allow for further definition of first use to accommodate demonstration, testing, or other peripheral use that may occur prior to "actual" customer usage. These preferred steps may comprise, by way of example, marking the date of first use as the time that a specified cumulative output has been reached, the time that output reached a specified level of daily output, or the like. In taking practice of these preferred invention steps with a printer by way of example, the warranty start date may be defined as the first day that total cumulative page output has reached ten, or the first day that daily output reaches three pages, or the like. Further, a level of output of zero could be specified as the warranty start event, with the result that the event would occur at initial power up of the product.

Other warranty start events in addition to date of first use may of course be comprised in the practice of other invention embodiments. For practice with computer peripherals, for example, a warranty start event may be defined as the installation of a peripheral driver or installer software tool. This is a less preferred alternative to date of first use, however, as it has been found that peripherals are often used with drivers or install tools other than those provided with the peripheral. Other examples of warranty start events comprise first (or other specified number) power up of the product, first (or other specified number) connection of the product to a network, or first (or specified number) power up of the product when network connectivity exists.

The warranty event is stored in memory, illustrated as block 4 in FIG. 1. Preferably, the memory comprises a non-volatile memory within the product. As used herein, the term "non-volatile memory" is intended to refer to memory that does not require continuous power to retain data. Those knowledgeable in the art will appreciate that a wide variety of such memory media are available that include, but are not limited to, magnetic and optical media, flash memory, circuitry, and the like. Also, the present invention is not limited to practice with memory that is internal to the product. Indeed, the memory used may be external to the product, and may for instance comprise a memory available on a locally connected computer, or memory available over network access.

Once a warranty start event has been defined or retrieved, method and computer program product embodiments of the invention comprise a subsequent step of determining whether the event has occurred (block 6). When practicing the invention with products such as computer peripheral document production apparatuses, performing this step may comprise for example determining when a specified cumulative number of pages have been output. Those knowledgeable in the art will appreciate that there are a number of ways to monitor number of pages output, with examples including counter mechanisms.

The embodiment of the method and program product of the invention illustrated in the flow chart of FIG. 1 comprises a step of continually searching for the occurrence of the warranty start event (block 6). As used herein, the term "continually searching" is intended to refer to a repeated search at approximately equal intervals. By way of example, "continual searching" as used herein could comprise execution of a computer executable loop that looks for the occurrence of the event at intervals from anywhere of the order of seconds to the order of hours. As warranty periods are most often defined in periods of days, it is preferred that occurrence of the warranty event is searched for with a frequency that will allow for an accuracy of less than a day to occur (i.e. determine time of warranty event to within a day). Further, the present invention is not limited to the determination of a warranty start date in units of a day, but may likewise be practiced to determine a warranty start date with any practical time unit, including but not limited to seconds, minutes, hours, weeks, months, or years.

Regardless of the desired units, once a warranty start event has been detected, this method and computer program product embodiment of the invention proceed to a group of steps for generating a timestamp that will serve as the warranty start date. As used herein, the term "timestamp" is intended to refer to a value that reflects the current time. The invention embodiment as illustrated in FIG. 1 first determines whether network connectivity exists (block 8). If it does, the invention embodiment proceeds to obtain the current time over the network (block 10).

As will be appreciated by those knowledgeable in the art, there are a number of methods for obtaining a current time value over a data network. Preferably, the invention embodiment comprises generating a network time protocol ("NTP") query to a time server. Also preferably, a time value is returned in a standard format such as UTC ("Universal Coordinated Time"). Other sources and formats for time values are of course also suitable for practice with the current invention, with sources and formats that allow for a suitable degree of reliability preferred. It is noted in this regard that a great deal of accuracy may not be required for the timestamp of the invention. That is, it may not be required to determine a warranty start date to a degree of accuracy of seconds or minutes. Accuracy of no more than a day may in fact be useful.

The network time server may be located by inquiry to a known server address stored in the memory. An Internet protocol address for a time server or for a well known web address, for example, may be stored in memory and accessed over the Internet for location of a time server. A plurality of potential timer server addresses may be stored and checked in succession until an available server is located. Additionally, a search may be made for an available time server. Finally, if network connectivity exists but no time source can be located over the network, embodiments of the invention may comprise querying a user for input of a time source location over the network.

If no network connectivity exists, this invention embodiment proceeds to steps for determining whether a local time source is available (block 12). Such a source may comprise, by way of example, a clock function on a computer device connected to the peripheral. This clock function could be queried through a system level call to the computer operating system or through other steps of interfacing with the operating system, peripheral driver, or other application running on the computer that is capable of reporting time. Additional "local" time sources could likewise be practiced within the scope of the invention as claimed, with a wireless query to a satellite, beacon, or like based times source; and query to a user requesting input of a current time value other examples. Once a current time value has been obtained, whether it has been generated by a local or a network source, the timestamp is set equal to the time value (block 16).

It is noted that some time sources such as personal computer operating systems may be less reliable than standard network sources, and may leave the method of the invention subject to disadvantageous inaccuracies, and perhaps even manipulation. That is, time sources that require setting or updating by users can lead to inaccurate warranty start times if they are not properly set. For this reason standardized and reliable time sources such as network time servers are preferred in the practice of the invention.

If network connectivity does not exist, and no local time sources are available, this embodiment of the invention proceeds to retrieve the date of manufacture from the memory (block 18) and to set the timestamp equal to this value (block 20). While the date of manufacture is disadvantageous to the user as a warranty start date, when no other time sources are available it is used with the general consideration that having some date is more advantageous than not having any date. Also, the date of manufacture is generally present in the memory for computer peripherals. Finally, from the manufacturer point of view, if no accurate source for a current time value is available and a date must be estimated for a warranty start date, a conservative estimation of the date of manufacture may be advantageous in that it will shorten the warranty period. The invention may further comprise storing an indicator to indicate that the warranty start date is the date of manufacture. This may be useful so that the manufacturer is alerted that the warranty start date is likely not accurate.

A still additional method embodiment comprises consulting an internal clock for obtaining a time stamp. Providing an internal time clock may not be the most preferred step for some products, as cost of the clock will be entailed. This may be mitigated, however, in that a clock of great accuracy is not required. A timestamp for warranty purposes may be useful with an accuracy of no greater than hours or even a day. Also, for products such as computers that are provided with internal time clocks for other purposes, the step of consulting an internal time clock will not be as disadvantageous.

Once a timestamp has been obtained, it is preferably encrypted (block 22), and placed in memory (block 24). Storage may be in any suitable formats, with examples comprising YYYYMMDD numeric codes. Encryption has the advantage of making the timestamp reportable by a user without knowledge of its contents. By way of example, additional steps of a preferred invention embodiment may comprise printing the encrypted timestamp on a diagnostic test page when the invention embodiment is practiced with a printer product. When subsequently seeking warranty service for the printer, the user could be requested to print a diagnostic page that included the encrypted timestamp. Upon reporting the encrypted timestamp, the manufacturer could then very quickly determine whether the printer was within the warranty period. Methods for encryption are generally known in the art, and for sake of brevity will not be discussed in any detail herein. By way of brief example, encryption generally comprises steps of encoding plain text into a encrypted format, with the thus encrypted format able to be converted back to its un-encrypted format by use of an encryption key.

Although not illustrated in the flow chart of FIG. 1, additional steps of a preferred invention embodiment comprise reporting the timestamp over the network to a warranty database. Preferably, the timestamp is reported along with a product identifier such as a product serial number for identification purposes. Further, the timestamp is preferably stored in the memory in a standardized manner such that it may be obtained through a query over the network. The warranty start date may thus be remotely obtained as desired for service or other purposes.

As discussed herein above, the present invention lends itself well to practice in the form of a computer program invention. Accordingly, it will be understood that various embodiments of the present invention comprise computer program products for causing a product to determine a warranty start date, with the program products comprising computer readable instructions recorded in a computer readable medium that when executed cause the computer to execute the steps of determining a warranty start date. Preferred examples of computer readable mediums include, but are not limited to, magnetic and optical media such as disks and the like, circuitry, embedded circuitry, and the like. The instructions may comprise programming language instructions such as Java, C++, visual basic, native code, and the like that preferably have been compiled into a machine executable format.

Also, it will be appreciated that as used herein the term computer is intended to refer to an apparatus having a processor capable of executing computer program instructions. Thus, as used herein, computer peripherals such as printers, copiers, facsimile machines, and combination machines having processors may all be considered "computers". A preferred embodiment of a computer program product of the invention, in fact, is practiced on a printer having a processor for executing the various instructions of the program product. This program product may comprise Java code, or a Java virtual machine, being executed by a processor of the printer.

Those knowledgeable in the art will appreciate that the present invention may be practiced in various ways and embodiments other than those discussed and illustrated herein. For example, the various actions of the flow chart of FIG. 1 would be carried out in a sequence other than that illustrated within the scope of the invention as claimed. Further, various of the actions illustrated could of course be combined or separated. By way of example, the date of manufacture, the warranty start event definition, and the timestamp may all be stored in separate memories. The memories may be any combination of mediums, and may be internal or external to the product.

Further, practice of the invention may comprise providing a plurality of warranty start dates for a plurality of warranties. By way of example, a printer product may have a first warranty covering a color printing mechanism and a separate warranty on the remainder of the product. A first warranty start event could then be defined as a printing of a desired cumulative number of color pages, with a second warranty start event defined as the printing of a cumulative number of pages regardless of color or black and white.

Figure 2:
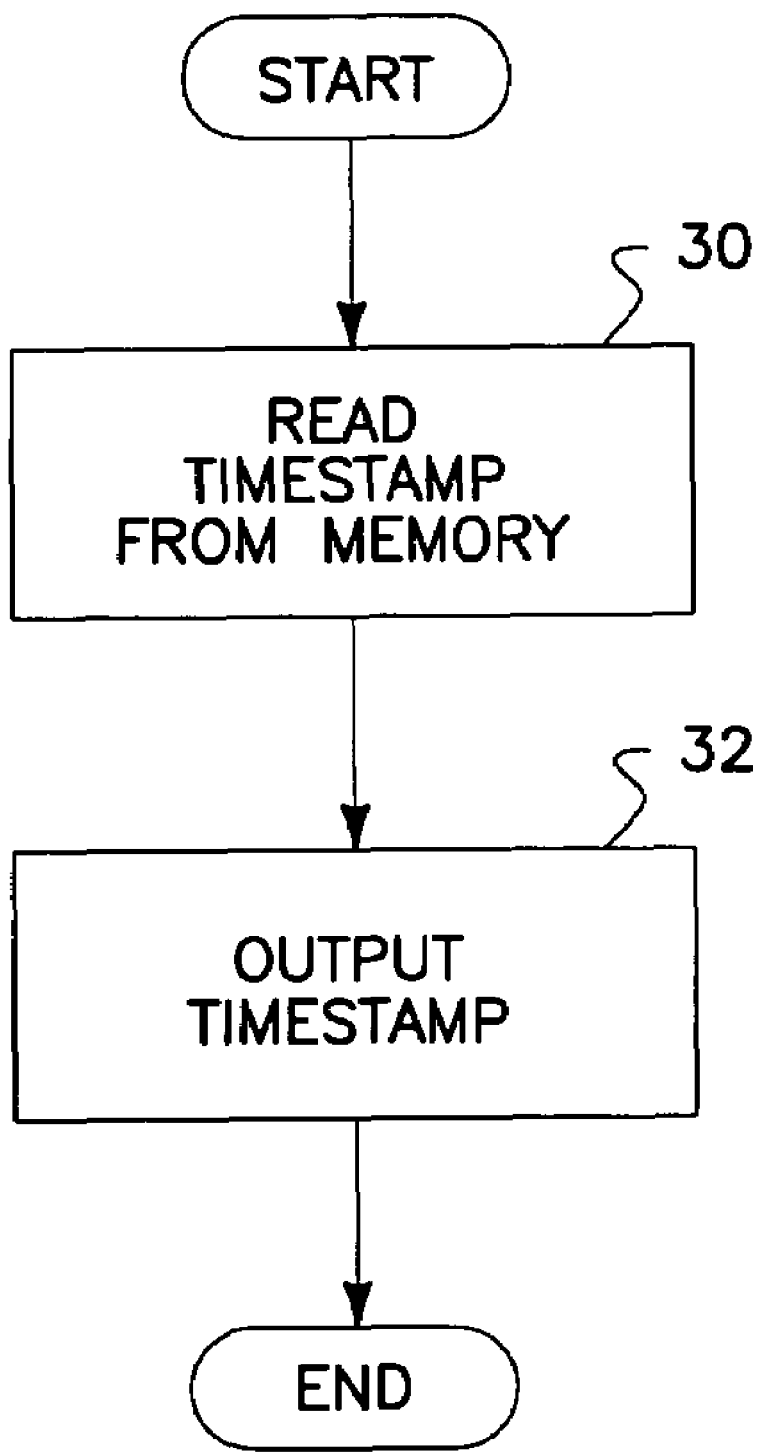
FIG. 2 is a flow chart illustrating steps of one embodiment of another method and computer program product of the invention.

Referring to FIG. 2, a flow chart of another method embodiment and computer program product embodiment of the invention is shown. The method of FIG. 2 may be executed after the execution of the method of FIG. 1 in one possible implementation.

At a step S30, the timestamp is read from memory and may be encrypted in one implementation. The timestamp may be read to determine the warranty start date in the described embodiment.

At a step S32, the timestamp read in step S30 may be outputted from the product, such as a computer peripheral, externally of the product. The timestamp may be used to determine a warranty start date in one embodiment. The encrypted timestamp can be outputted on a product test page or diagnostic test document in exemplary embodiments.

In addition, although practice of the invention with computer peripherals has been discussed herein, it will be appreciated that the invention will be useful for practice with a wide variety of products. Although products that may be connected to a network are preferred, practice with other products is likewise practical. Examples of additional products suitable for practice of the invention include, but are not limited to, computers; handheld computer devices; communications devices such as phones and radios; machine tools; electronics such as televisions, registers, security systems, and the like; industrial equipment such as electronic tools and vehicles; and the like.

The advantages of the disclosed invention are thus attained in an economical, practical, and facile manner. While preferred embodiments and example configurations have been shown and described, it is to be understood that various further modifications and additional configurations will be apparent to those skilled in the art. It is intended that the specific embodiments and configurations herein disclosed are illustrative of the preferred and best modes for practicing the invention, and should not be interpreted as limitations on the scope of the invention as defined by the appended claims.

What is claimed is:

1. A method comprising:
    defining a warranty start event for a product for printing documents, wherein the warranty start event comprises printing a specified number of documents greater than one;
    printing the specified number of documents greater than one using the product;
    generating a timestamp for the product after detection of the occurrence of said warranty start event;
    storing said timestamp in a memory; and
    reading said timestamp from said memory to determine said warranty start date.

2. A method as defined by claim 1 wherein said memory is internal to the product.

3. A method as defined by claim 1 wherein said step of generating a timestamp comprises obtaining said timestamp from a clock internal to the product.

4. A method as defined by claim 1 wherein the product is connected to a data network, and wherein said step of generating a timestamp comprises obtaining said timestamp over the network using the product.

5. A method as defined by claim 1 wherein the product is connected to a data network, and wherein said memory is remotely located from the product and is accessible over the network.

6. A method as defined by claim 1 wherein the product is for connection to a data network, and wherein said step of generating a timestamp comprises obtaining a timestamp over the data network.

7. A method as defined by claim 6 wherein said step of obtaining a timestamp over the network comprises connecting to a time server over the network, querying said time server with a network time protocol query for a time value, and obtaining a time value from said time server in a network time protocol.

8. A method as defined by claim 1 wherein said step of storing said timestamp in said memory further comprises encrypting said timestamp.

9. A method as defined by claim 8 wherein the method further comprises the step of outputting said encrypted timestamp from the product.

10. A method as defined by claim 1 wherein the method further comprises the step of continuously searching for occurrence of said warranty start event to detect the occurrence of said warranty start event.

11. A method as defined by claim 1 wherein the generating the timestamp comprises generating the timestamp using the product.

* * * * *